United States Patent [19]

Black et al.

[11] Patent Number: 5,226,111
[45] Date of Patent: Jul. 6, 1993

[54] ORGANIZATION OF THEORY BASED SYSTEMS

[75] Inventors: Damian S. Black; John C. Manley, both of Bristol, England

[73] Assignee: Hewlett-Packard Company, Palo Alto, Calif.

[21] Appl. No.: 682,754

[22] Filed: Apr. 8, 1991

Related U.S. Application Data

[63] Continuation-in-part of Ser. No. 247,451, Sep. 6, 1988, abandoned.

[30] Foreign Application Priority Data

Jan. 6, 1987 [GB] United Kingdom ............... 8700188
Jan. 6, 1988 [WO] PCT Int'l Appl. ............... PCT/GB88/00005

[51] Int. Cl.$^5$ .................. G06F 15/18; G06F 15/40
[52] U.S. Cl. .................. 395/54; 395/62; 395/66; 395/600; 364/DIG. 1; 364/283.4; 364/274.3
[58] Field of Search .......... 395/54, 51, 52, 53, 395/66, 67, 62, 903, 904, 600; 364/DIG. 1, DIG. 2

[56] References Cited

U.S. PATENT DOCUMENTS

| | | | |
|---|---|---|---|
| 4,884,218 | 11/1989 | Agnew et al. | 395/54 |
| 4,888,690 | 12/1989 | Huber | 395/600 |
| 4,930,071 | 5/1990 | Tou et al. | 364/200 X |
| 5,016,204 | 5/1991 | Simoudis et al. | 364/578 |
| 5,025,392 | 6/1991 | Singh | 395/54 |
| 5,063,522 | 11/1991 | Winters | 395/54 X |
| 5,065,338 | 11/1991 | Phillips et al. | 395/54 X |

OTHER PUBLICATIONS

Yokota—"A Model and an Architecture for a Relational Data Base"—13th Annual International Symposium on Computer Architecture, Tokyo, Japan; Jun. 1986; pp. 2-9.

Bocca—"Logic Languages and Relational Databases: The Design and Implementation of Educe"—ICL Technical Journal; May 1987, pp. 425-448, Oxford, Gr. Britain.

*Primary Examiner*—Joseph Ruggiero

[57] ABSTRACT

A method of controlling the operation of a computer database system. The method of the invention is particularly adapted for use in processing a query in a computer system which has an inference engine, query processing means, and a set of object theories and metatheories. The method includes providing a system theory to define coupling relationships between the object theories and metatheories, selecting an object theory and associated metatheories according to the system theory in dependence on parameters of a query to be processed, and processing the query by the theories so chosen. The coupling relationship may be an interpreter, an assimilator or an attribute metatheory.

4 Claims, 3 Drawing Sheets

ORGANIZATION OF THEORY BASED SYSTEMS

CROSS REFERENCE TO RELATED APPLICATION

This is a Continuation in Part application of copending application Ser. No. 07/247,451 filed Sep. 6, 1988, abandoned.

The present invention relates to the organization of theory-based systems and, more particularly, to the organization of a logic programming system or knowledge representation and management system based on logic programming, which incorporates a provability interface to multiple modules, databases or theories.

The basic terms such as theory, metatheory, assimilation, and provability used in this specification follow the usage of D. A. Bowen and R. A. Kowalski, "Amalgamating Language and Metalanguage in Logic Programming", pages 153-182 of Logic Programming, edited by K. L. Clark and S. A. Ternlund, Academic Press, New York, 1982 and also K. A. Bowen and T. Weinberg, "A Meta-level Extension of Prolog", pages 48-53 or 1985 Symposium on Logic Programming, Boston, IEEE. It is to be understood that the term "theory" as used herein encompasses equivalent concepts such as logic databases, modules and worlds (the latter term being one used by H. Kauffmann and A. Grumbach in "Representing and Manipulation Knowledge within Worlds", at pages 61-73 of Proc First Int Conf on Expert Database Systems, Edited by L. Kershberg, 1986).

The present specification also assumes a basic knowledge of logic programming such as that possessed by any skilled worker in the field. In particular, some knowledge of the logic programming language Prolog is assumed. For a basic text, refer to "Programming in Prolog", W. F. Clocksin and C. S. Mellish, Springer-Verlag, 1984). Another very useful reference is the paper by R. A. Kowalski entitled 'Problems and Promises of Computational Logic' published as part of the Computational Logic Symposium Proceedings, Brussels, November 1990 and edited by J. W. Lloyd. The basic concepts of a knowledge-base management system are also assumed (see Proc First Int Conf on Expert Database Systems, cited above).

Rather than having a homogeneous knowledge base, in practice, some kind of partitioning of the facts and rules of a knowledge base system is often desirable for various reasons some examples of which are:

modularization of knowledge can reflect the conceptual structuring of a problem, it permits the existence of mutually inconsistent theories:

a partition of the knowledge base can be treated as an 'object' for purposes of metaprogramming—specialized inference control and specialized assimilation control can be particularized to certain partitions. Those partitions can be subjected to more than one regime of control;

it is the primary mechanism through which scale is controlled. Partitions are not affected by the growth of other partitions as they might be with flat knowledge bases; theories become a code module structure (theories can be reused in more than one application);

the partitioning of knowledge in theories enables different theories to be realized in foreign systems where desirable. For example one theory which appears to be a large set of ground structureless facts might in reality be stored in a relational database and managed by a relational database management system.

The simplest form of partitioning is to divide the system into entirely independent theories. However, this effectively results in a number of entirely independent modules, which is of very little use. A more useful form of partitioning involves modularising the knowledge base into distinct subsystems, but preserving some form of coupling between those subsystems.

Two main types of partitioning are possible.

If the functionality of a theory is considered in detail, it will be realized that several reasonably distinct areas of functionality can be distinguished. These functionalities can be partitioned out from the basic theory as metatheories; theories which are concerned with the basic theory as an object or operand.

One function of the basic theory is the inbuilt reasoning or interpretation function, but in some circumstances it may be desirable to provide an additional and more elaborate interpreter function. If it is desired to be able to update the theory, then assimilator means are required with the functionality for ensuring the updates do not introduce inconsistency. Further, the updating may involve checking against factual data to ensure, for example, that various values are within appropriate ranges, and the range information may be regarded as attribute information distinct from the functionality of assimilation, requiring an attribute function.

Thus it may be desirable to have a number of metatheories, performing different specialized functions, associated with a given theory. The present system provides for three types of metatheory—interpreter, assimilator and attribute metatheories.

The use of such metatheories and the sharing of metatheories between object theories is known e.g. from the Bowen and Weinberg paper mentioned in the introduction of this application.

Another type of partitioning is the partitioning of the basic or main theory into different subject matters, giving a set of theories, all on the same "level", which we can conveniently describe as object theories.

Although these two types of partitioning are logically distinct, it is advantageous to use them in combination. This permits the sharing of a single metatheory by several object theories, whereas partitioning of object theories alone would require the same metatheory statements and rules to appear in several object theories.

Figure 1:
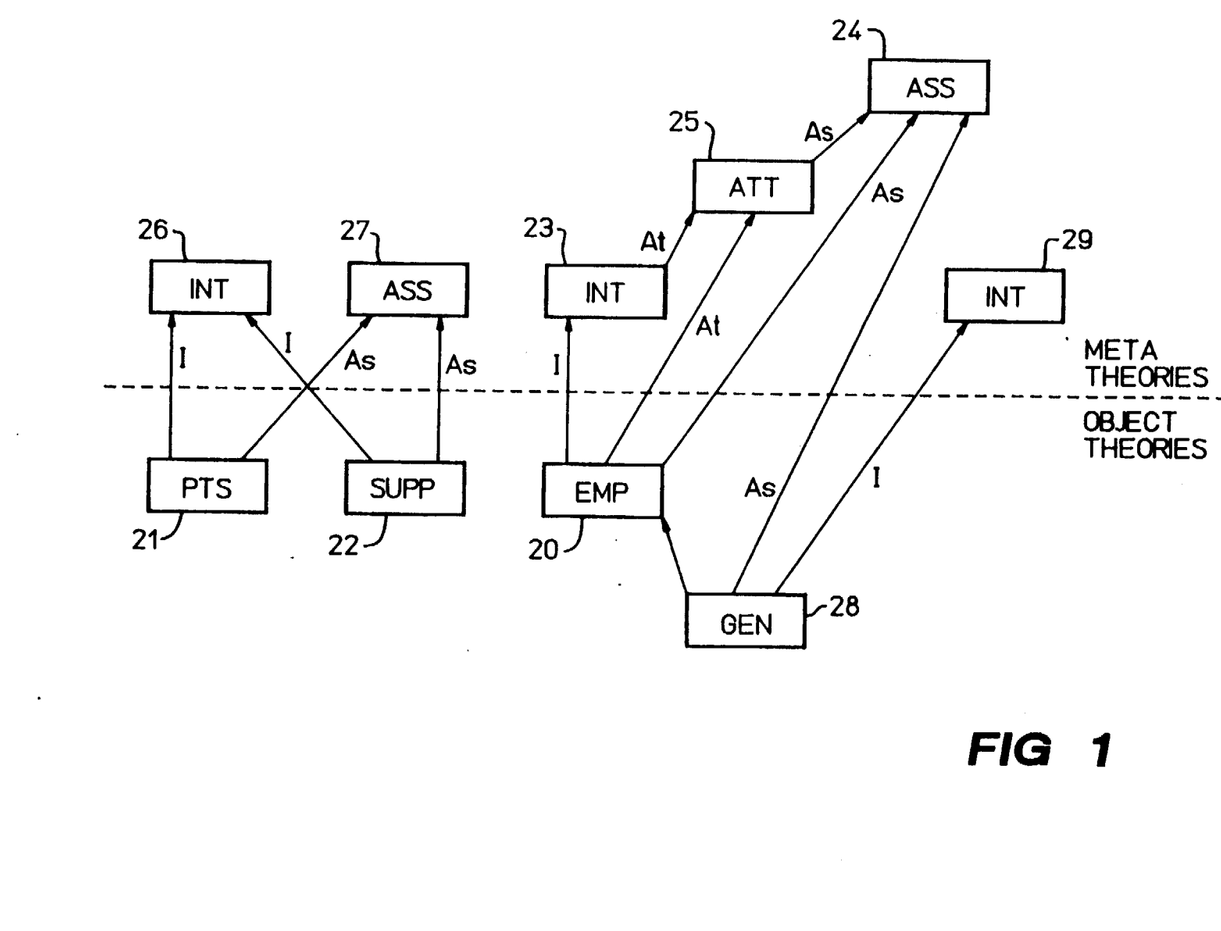
FIG. 1 depicts known types of partitioning.

FIG. 1 of the accompanying drawings illustrates known types of partitioning by showing a fragment of a hypothetical system containing a variety of different theories and the relationships between them. The principal forms of relationship are illustrated in this example, which gives the flavour of a relational database application.

The theory-metatheory relationships are of three different kinds, of a theory with its interpreter, assimilator, and attribute metatheories; these are indicated by the different types of line indicated as I, As, and At respectively.

Three object theories 20 to 22—an employment theory 20, a parts theory 21, and a suppliers theory 22—are together equivalent to a typical database of primarily factual data. The employment theory 20 is primarily a collection of facts concerning various people; it includes their employment details and also various simple relationships between them (such as spouse and parent-child relationships). The parts theory 21 is primarily a collection of facts about parts and components for a factory and the suppliers theory 22 is primarily a collection of facts about the suppliers of various raw materials for the factory.

The parts theory 21 and the suppliers theory 22 are both inherently factlike and so each can have an interpreter which takes account of this and performs fact look-up instead of full theorem proving. These two theories therefore have a common interpreter 26. In the same way, they have a common assimilator 27, which ensures that the individual theories remain semantically consistent. This therefore illustrates two of the three types of theory-metatheory relationship and a metatheory being used by two different object theories.

The employment theory 20 has an interpreter theory 23, an assimilator theory 24 and an attribute theory 25. The employment theory may include certain rules in addition to factual statements, so its interpreter 23 must incorporate a full theorem prover. The assimilator theory 24 is a specialized assimilator which ensures that any new data added to the employment theory does not violate any specified constraints.

One type of constraint concerns the nature of the data being added; for instance, it must be consistent with a group of data, such as employee grade data, that is allowed in that theory. The allowed groups of data are defined in the attribute theory 25, which contains all the metadata about the employment theory. Thus to perform this check, the assimilator needs to reference (prove a result) in the attribute theory. Thus the metatheory level need not be flat; a metatheory can be manipulated by a further metalevel which is a "metametatheory" to the original object theory and simultaneously a metatheory to the original metatheory.

In addition to the three fact-like theories 20 to 22, there is a genealogy object theory 28, which is primarily composed of a set of rules defining complex genealogical relationships, such as ancestorhood and cousinhood and many of which are therefore recursive. This theory has a special interpreter theory 29, which is designed to deal efficiently with recursive rules and so restrict the types of inference explosion that can otherwise arise with such rules. The genealogy theory itself draws on the simple personal relationship information contained in the employment theory 20. This is a further type of theory-to-theory relationship, between two object theories.

Returning to the employment theory 20, its assimilator theory 24 also takes account of a further type of constraint pertaining to the "meaning" of the data, for instance whether a new employee's relationship that is being added is consistent with the theory and with the knowledge about relationships held in the genealogy theory. This will involve the assimilator requiring results to be proved in the genealogy theory.

The present invention is concerned with an architecture for organising theories in a theory-based system. The prior art only addresses the issue of theory reference in terms of references to one theory within another. The issue of the overall organisation of theories in a theory-based system is not addressed at all.

According to the present invention there is provided, in a system comprising a plurality of object theories and metatheories having coupling relationships between them, an inference engine, and query processing means, the method of processing queries comprising: providing a system theory which defines the coupling relationships between the theories, processing the query by the system theory to choose an object theory and associated metatheories in dependence on the parameters of the query and processing of the query by the theories so chosen. The present invention thus provides a new system arhitecture for a theory-based system and one which gives rise to substantial technical advantages as will be explained.

DETAILED DESCRIPTION OF THE INVENTION

A system theory provides an organisation of the theories it contains. Since it is itself a theory it can participate in higher level organisations of system theories. This higher level organisation therefore contains many system theories which may be an evolution of one system theory or an organisation of several evolutions of unconnected system theories. This higher level organisation could itself be described by a theory and so could participate in even higher level organisations and so on.

A system theory can be regarded as an architecture which supports the storage, retrieval and updating of knowledge modularised into separate theories. Each theory in the system is associated with three other theories. All three are metatheories with respect to that theory, which correspondingly is an object theory with respect to those metatheories. First, there is an interpreter metatheory, which defines a provability relationship for the object theory, supporting query satisfaction as theorem proving. The interpreter controls inference within the object theory, supporting explicit, domain-specific characterizations of the object theory clauses where available. Second, there is an assimilator metatheory, which extends the logical update primitives provided by the underlying knowledge base management system to enforce syntactic and semantic constraints (both local and global) on updates of the object theory. Third, there is an attribute metatheory which expresses characteristics of the object theory clauses, such as type constraints, used by interpreters and assimilators to control inference and updating.

The partitioning of this theory-specific metaknowledge allows interpreters and assimilators to be shared amongst several different object theories.

An interpreter theory may for example incorporate means for backtracking through a succession of theories having an inheritance relationship. One form of inheritance is merely theory selection, where a goal is proved in one member of a set of theories with an inheritance relationship. A more elaborate form of inheritance can readily be incorporated in a theory's interpreter, such that when the interpreter tries to satisfy a goal in a named theory and fails, it does not back-track to the previous goal; instead, it queries the system to find the name of a theory from which the current theory inherits and tries to satisfy the current goal in the ancestral theory. This elaboration allows each individual subgoal to be tried in each theory, instead of only the overall goal.

The primary use of attribute theories is to allow particular theory-dependent information to be abstracted out of interpreters and assimilators. This enables the interpreters and assimilators to be made relatively independent of particular theories and hence to be applicable to more than one object theory.

All assimilation proceeds via a standard interface, like the standard query interface, update(System,TheoryName,Updates,NewSystem,NewTheory). In a similar manner to interpretation, each assimilator must understand and be able to translate into, the representation of the theory it is updating. An update is specified as a list of actions—all actions are eventually reduced to primitive declarative add and delete operations on the theory being updated. The simplest form of assimilator simply carries out such additions and deletions. A more elaborate assimilator will carry out some form of checking for consistency either clause by clause as they are added (with provision for ignoring unavoidably inconsistent states of the theory during updating) or on the theory as fully updated; in either case, there is provision for backtracking and restoration of the original state of the theory in the event of an attempted illegal update. As with interpreter theories, the abstraction of consistency checking from a theory into an assimilator theory makes it more likely that an assimilator theory will be applicable to more than one theory. The system theory itself also has its own assimilator. A typical task for the system assimilator might be to check that when a new theory is being added to the system, all of its nominated metatheories also belong to the system.

Since interpreters and assimilators are themselves theories, they also may be associated with metatheories. An interpreter theory (object theory) will in turn require another interpreter theory (metatheory) to control inference within the first interpreter theory. Likewise assimilator theories and attribute theories will require interpreter theories. Conversely, interpreter and assimilator theories may also require attribute theories and so on. However, only one or two levels of interpretation will be used in practice, for reasons of efficiency. This apparent infinite regress is terminated by special built-in interpreter and assimilation theories.

In the architecture of the invention a knowledge base is represented by a special type of theory, the system theory, but one which is distinguished only by its role. The system theory is a declarative statement of all theories in the system and the relationships between them. The system theory describes the relationship between the name of a theory, the theory itself and the names of its metatheories. In defining this relationship, the full power of Horn clause logic can be brought to bear. For example, a named object theory can have many interpreters and a particular interpreter may be used on many object theories. The system ability to represent many-to-many relationships between theories and their metatheories and allows reasoning within the system about which metatheory is appropriate for a particular task.

In the preferred arrangement, the system theory statement are preferably five-place clauses, with one place for a theory name and the other four places corresponding respectively to an object theory, an interpreter metatheory, an assimilator metatheory and an attribute metatheory therefor.

An example of the
form of statements in the system theory is shown below:

| Theory Name | Theory | Interpreter | Assimilator | Attribute |
|---|---|---|---|---|
| "theory" | (calc, | $T_1$, | prologInt, | prologAss, | none) |

-continued

An example of the
form of statements in the system theory is shown below:

| Theory Name | Theory | Interpreter | Assimilator | Attribute |
|---|---|---|---|---|
| "theory" | (calc, | $T_1$, | calcInt | prologAss, | none) |
| "theory" | (calcInt, | $T_2$, | prologInt, | prologAss, | none) |
| "theory" | (calcInt, | $T_2$, | prologInt, | calcAss, | none) |
| "theory" | (calcAss, | $T_3$, | prologInt, | prologAss, | none) |
| "theory" | (system, | $T_4$, | prologInt, | prolog Ass, | none) |

In each of the five place statements in the system theory, the first place is filled by a theory name. The second item in each of the "theory" statements is the object theory named in the first item. In this embodiment, the second place is filled by the theory itself, not just an address where the theory can be found. The third, fourth and fifth items are the names of the relevant interpreter, assimilator and attribute theories respectively. Where the interpreter, assimilator or attribute theory is not the basic interpreter, assimilator or attribute theory (prolog-Int, prologAss, none respectively—the built-in attribute theory is called 'none' which names the empty theory), an entry for that metatheory also appears as a statement in the system theory. This enables the appropriate metatheory to be accessed. The system therefore supports arbitrary levels of interpretation to be introduced in handling a query—an interpreter is found by querying the system (that is, the system theory), and then this interpreter is interpreted by another interpreter found by querying the system and so on.

Such a sequence of metatheories must of course terminate eventually. This achieved by defining a built-in set of metatheories, "prologInt", "prologAss" and "none" and ensuring that every sequence of metatheories terminates in the appropriate built-in metatheory. A sequence can of course call one or more of the built-in metatheories directly.

The system theory contains other statements governing the resolution of theory names. For example, there could be two five-place statements in the system theory which have the same theory names (although the object theories will be different) and further statements in the system theory for resolving the theory names. For example, there could be two entries for a theory named "tax", each having the same set of three named metatheories, although one of the tax theories is for 1989 calculations and the other for 1990 calculations. The system theory will have other statements permitting inferencing about which tax theory to select on the basis of the parameters given in the query. Instead, or as well, information in the system attribute theory may be used for resolving theory names eg. information such as who wrote a theory and when.

The system theory also contains rules governing how metatheories are selected. For example, the 'calc' theory may be for calculating the prime factors of a given number and the system theory may contain a rule specifying that when the given number is greater than a certain threshold the calcInt interpreter should be used, otherwise the prologInt interpreter should be used.

The present system thus provides a new and improved technique for resolving theory names and for defining metatheories for each theory allowing the selection among a plurality of theories in dependence on circumstances defined by the particular query.

The system theory contains a statement for every theory in the system and therefore contains an entry for itself (shown as the last statement above). FIG. 4 depicts the way in which the system theory references the theories in the system.

An example of a system theory is appended as Appendix A. Each five-place statement begins with "theory" and each actual object theory is prefaced by a hash symbol.

Figure 2:
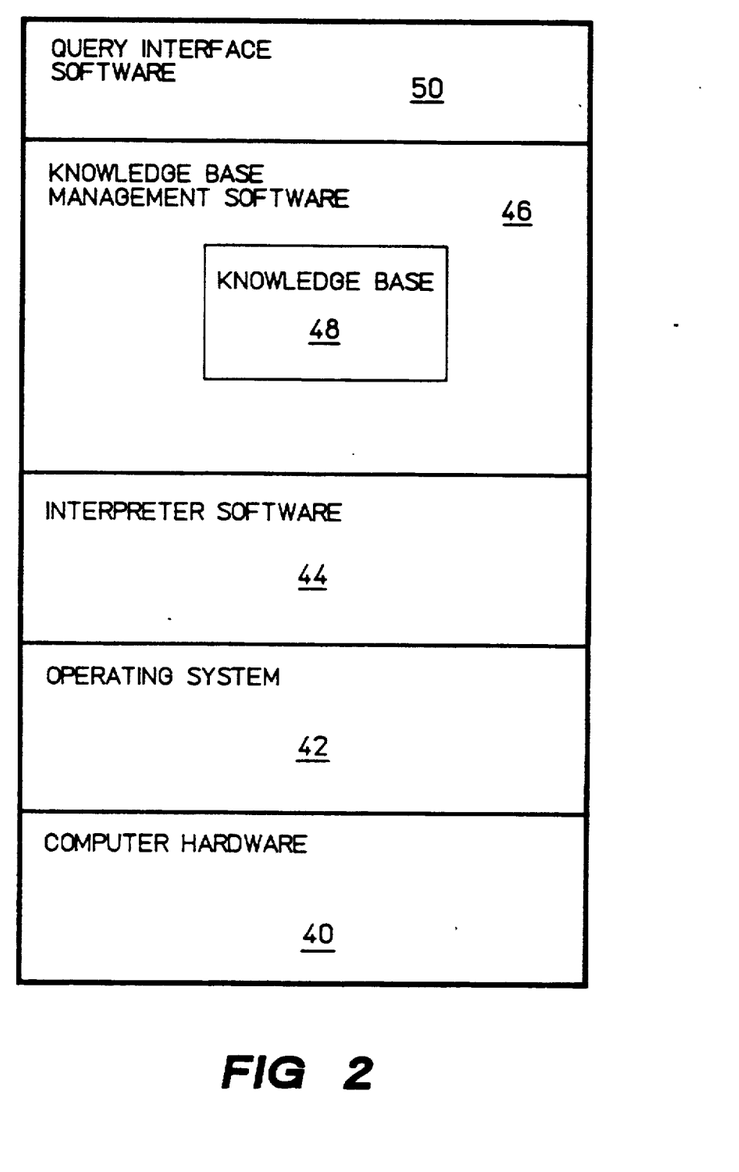
FIG. 2 shows the main components of a system according to the present invention.

FIG. 2 shows the main components of a system 35 according to the present invention.

Hardware 40 may comprise a model from the 300, 400 or 800 series of the Hewlett-Packard HP9000 family of computers, an HP3000, 900 series or an IBM-AT compatible PC; operating system software 42 such as the UNIX operating system, the MPE/XL operating system or the OS/2 operating system, depending on the platform used; interpreter software 44 comprising a Prolog interpreter; a knowledge base management system (KBMS) 46 according to the present invention comprising a knowledge base 48; query interface software 50 for translating input queries into a form which can be processed by the system 35. The query interface software 50 may comprise a query interface theory which can convert a standard database query language into an appropriate form for querying any of the other theories in the system.

The KBMS 46 comprises at least one system theory defining a knowledge base 48. It is possible for the KBMS to contain a plurality of independent system theories and/or theories which are independent of the or each system theory.

Whenever a query is made in a named theory, that theory must be located via the system theory. This is achieved by querying the system, by means of a predicate interface which is standard for all theories. This interface operates in the underlying knowledge base management system (KBMS) 46 and takes a theory name and a set of goals: prove(System,TheoryName,-Goals). The system theory is consulted to resolve the name of the theory and the name of its interpreter. If there is more than one interpreter for the named theory, then inference within the system is used to choose between them. The KBMS then attempts to prove that the interpreter can solve the goals (if an interpreter is required for the interpreter, recursion occurs until the built-in interpreter is reached). The use of interpreters specific to individual theories can increase the efficiency of proving goals, since the proof techniques can be matched to the specific domains of the various theories, using appropriate syntactic and semantic constraints in inference control.

The implementation of a system written in Prolog will not be described in detail since this forms part of the knowledge of the average skilled person in the field of logic programming. However, an outline will be given.

A prolog system can essentially be implemented using a simple stack model. The whole nature of theorem-proving using the Prolog depth-first, left-to-right, backtracking form of resolution lends itself to being realized using a stack at the centre of the implemented system. A step of inference proceeds through four basic steps: goal selection, where the next goal from the set of outstanding goals to be satisfied is selected—in Prolog this is simply the goal at the top of the goal stack; clause selection, where a clause is selected from the relevant procedure in the relevant part of the knowledge base—this clause must have a head that is (or potentially is) unifiable with the goal selected; unification, where the goal selected and head of the clause selected are unified; combination of subgoals, where all the goals in the body of the clause selected are pushed onto the top of the goal stack.

Thus it would appear that a single stack is sufficient to implement a Prolog system—a control stack where the set of outstanding goals to be satisfied in the computation are kept, and where the requirements of the system treat this purely as a LIFO (last-in, first-out) stack. However, on inspection it transpires that a second stack is necessary to retain terms which are bound to variables and would be popped off the control stack if the one-stack model were used. The second stack, the copy stack, is therefore introduced to act as the store for any such terms which would otherwise be lost. A third stack is also necessary to ensure that state can be faithfully restored on the copy stack during backtracking.

A fuller explanation of these stacks, and Prolog implementation in general, may be found in "Implementing Persistent Prolog", Coulomb, RM, Ellis Hardwood 1990, ISMB 0-13-453531-6.

In accordance with the present invention, for all incoming queries, theory names are resolved and the appropriate metatheories are selected using the system theory before the query is processed.

Since the invention is used in implementing a flexible query (provability) and assimilation (updating) interface to a logic programming system (KBMS), the invention can be implemented by means of a Prolog program fragment implementing this facility. Such a program with statements in first-order logic thus forms a detailed embodiment of the invention. (The implementation of theories within Prolog is straightforward and not described here).

The following description is in the form of a particular predicate theory (the system theory) which relates theory names to theories to interpreter names, assimilator names and attribute names. The system theory contains, interalia, a 5-place predicate "theory" relating a theory name TheoryName with a theory Theory, an interpreter theory name IntName, an assimilator theory name AssName and an attribute theory name AttrName.

A formal definition in first-order logic of the meaning of "prove" and "update" is as follows. Clauses defining the conditions under which particular associations apply are represented within the system theory. The system theory is used during the first stage of query and update handling and specified in the third (prove) and fifth (update) predicates.

| | |
|---|---|
| prove (System, system, Goals):- interpretTheory (System, Goals). | (Clause 1) |
| prove (System, prologInt, interpret (TheoryName, Theory AttrName, Goals):- interpretTheory (Theory, Goals). | (Clause 2) |
| prove(System, TheoryName, Goals):- prove(System, system, theory(TheoryName, Theory, IntName, AssName, AttrName). | (Clause 3) |
| prove(System, Intname, interpret(TheoryName, Theory, AttrName, Goals). | |
| update(System, TheoryName, Clauses, NewSystem, NewTheory):- prove(System, system, theory(TheoryName, Theory, IntName, AssName, AttrName)) | |
| prove(System, AssName, assimilate(System, Theory, AttrName, Clauses, NewTheory), updateSystem (System, TheoryName, Theory, New Theory, NewSystem). | |

The meaning of these predicates, variables and functions is as follows:

1) "prove(System,TheoryName,Goals)" is true if the goal (or query) "Goals" is provable in the theory named "TheoryName", where the system theory "System" defines the naming relationships (i.e. which name names which theory, interpreter, assimilator, attributes). In the case given, the clauses restrict the system theory's interpreter to being Prolog—like (the built-in interpreter).

2) "update(System,TheoryName,Clauses,NewSystem,NewTheory) is true if the clauses "Clauses" are added to the theory named "TheoryName" in the system theory "System" to produce the new theory "NewTheory" and the new version of the system containing "NewTheory", "NewSystem". "NewSystem" is created from "System" in such a way that "TheoryName" now names the new theory.

3) "IntName", "AssName" and "AttrName" represent the names of a theory's interpreter, assimilator and attributes (see above) respectively.

4) "interpret(TheoryName,Theory,AttrName,Goals)" is true if the compound goal "Goals" is provable in the theory "Theory" having name "TheoryName" and an attribute theory named "AttrName".

5) "assimilate(System,TheoryName,Theory,AttrName,Clauses, NewTheory)" is true if the clauses "Clauses" can be added to the theory "Theory" to yield a new theory "NewTheory" given "AttrName" and the system theory "System".

6) "interpretTheory(TheoryName,Goals)" is true if the goal "Goals" is provable using the Prolog-like proof procedure.

7) "updateSystem(System,TheoryName,Theory,NewTheory, NewSystem)" is true if the system theory "NewSystem" differs from the system theory "System" by having the theory "NewTheory" associated with the theory name "TheoryName" instead of the theory "OldTheory".

A specific example of the operation follows. We suppose that we want to find the 8th term of the Fibonacci series, using a function "fib" by which we have defined the series.

| The system theory comprises the following statements: | |
|---|---|
| theory (system, Theory, prologint, prologAss, none) | <- system(Theory) & true |
| theory (fib, theory-a80f8, prologint, prologAss, none) | <- true |
| theory (lemma, theory-a8510, prologint, prologAss, none) | <- true |
| theory (fibbattr, theory-a8638, prologint, prologAss, none) | <- true |
| theory (fibl, theory-a8734, lemma, prologAss, fibattr) | <- true |
| theory (myprove, theory-a8bd8, prologint, prologAss, none) | <- true |
| theory (myprove, theory-a8bd8, prologint, prologAss, none) | <- true |

Reference numbers for the relevant theories appear in the second places in each statement for the purpose of this description, in actuality the whole Theory term resides in those positions.

The query is:
prove (System, fib, fib(8, N))

| The steps in the prove process are shown below: | |
|---|---|
| clause 3 (call): prove(theory-a8f84, fib, fib(8, N)) | C1 |
| clause 1 (call): prove(theory-a8f84, system, theory(fib, Theory, IntName, AssName, AttrName)) | C2 |
| clause 1 (call): interpretTheory(theory-a8f84, theory(fib, Theory, IntName, AssName, AttrName)) | C3 |
| clause 1 (exit): interpretTheory(theory-a8f84, theory(fib, theory-a80f8, prologint, prologAss, none)) | E3 |
| clause 1 (exit): prove(theory-a8f84, system, theory(fib, theory-a80f8, prologint, prologAss, none)) | E2 |
| clause 2 (call): prove(theory-a8f84, prologint, interpret(fib, theory-a80f8, none, fib(8, N)) | C4 |
| clause 1 (call): interpretTheory(theory-a80f8, fib(8, N)) | C5 |
| clause 1 (exit): interpretTheory(theory-a80f8, fib(8, 34)) | E5 |
| clause 2 (exit): prove(theory-a8f84, prologint, interpret(fib, theory-a80f8, none, fib(8, 34)) | E4 |
| clause 3 (exit): prove(theory-a8f84, fib, fib(8, 34)) | E1 |

On the left hand side is indicated the relevant clause of the "prove" predicate and whether the clause is being called or exited (i.e. with the relevant variables instantiated). The nesting of the calls is indicated on the right hand side where C indicates call and E indicates exit.

In the first call, the "prove" predicate is invoked. In the second call, "prove" is used to look for the theory which is needed to deal with the function "fib", together with the appropriate metatheories. To achieve this, a third call has to be made to satisfy "interpretTheory". This third call returns the theory for "fib" and the appropriate metatheories and these are returned in the exit from the second call. The fourth call attempts to satisfy the Fibonacci function itself. This involves the fifth call, which reaches the Fibonacci theory (identified by fib) and returns the answer to the fourth call, which then makes the final return with that answer. The answer is declared in the answer to the first call.

In terms of the formal definitions given above, the second call proves the first subgoal of clause 3 and the third call proves the first clause, the fourth call proves the third clause of subgoal 2 and the fifth call proves the second clause of that subgoal.

In another example, suppose we wish to update the theory fib by including the fact that the first negatively-indexed Fibonacci number is zero.

| The system theory comprises the following statements: | |
|---|---|
| theory(system, Theory, prologInt, prologAss, none) | <- system(Theory) & true |
| theory(fib, theory-aa12c, prologInt, prologAss, none) | <- true |
| theory(lemma, theory-a86bc, prologInt, prologAss, none) | <- true |
| theory(fibattr, theory-a87e4, prologInt, prologAss, none) | <- true |
| theory(fibl, theory-a88e0, lemma, prologAss, fibattr) | <- true |
| theory(myprove, theory-a8d84, prologInt, prologAss, none) | <- true |
| theory(prologAss, theory-a94d8, prologInt, prologAss, none) | <- true |
| nil | |

| The steps in the "update" process are shown below: | |
|---|---|
| clause 1 (call): myupdate(theory-a96ac, fib, assert(fib(−1, 0)), nil, S7, NT) | C1 |
| clause 1 (call): prove(theory-a96ac, system, theory(fib, theory, IntName, AssName, AttrName)) | C2 |
| clause 1 (call): interprettheory(theory-a96ac, theory(fib, Theory, IntName, AssName, AttrName)) | C3 |
| clause 1 (exit): interpretTheory(theory-a96ac, theory(fib, theory-a82a4, prologInt, prologAss, none)) | E3 |
| clause 1 (exit): prove(theory-a96ac, system, theory(fib, theory-a82a4, prologInt, prologAss, none)) | E2 |
| clause 3 (call): prove(theory-a96ac, prologAss, assimilate (theory-a96ac, theory-a82a4, none, assert(fib(−1, 0)), nil, NT)) | C4 |
| clause 1 (call): prove(theory-a96ac, system, theory(prologAss, Theory, IntName,, AssName, AttrName)) | C5 |

-continued

| | |
|---|---|
| clause 1 (call): interpretTheory(theory-a96ac, theory(prologAss, Theory, IntName, AssName, AttrName)) | C6 |
| clause 1 (exit): interpretTheory(theory-a96ac, theory(prologAss, theory-a94d8, prologInt, prologAss, none)) | E6 |
| clause 1 (exit): prove(theory-a96ac, system, theory(prologAss, theory-a94d8, prologInt, prologAss, none) | E5 |
| clause 2 (call): prove(theory-a96ac, prologInt, interpret(prologAss, theory-a94d8, none, assimilate(theory-a96ac, theory-a82a4, none, assert(fib(−1, 0)), nil, NT)) | C7 |
| clause 1 (exit): interpretTheory(theory-a94d8, assimilate(theory-a96ac, theory-a82a4, none, assert(fib(−1,0)), nil, theory-aa12c)) | E8 |
| clause 2 (exit): prove(theory-a96ac, prologInt, interpret(prologAss, theory-a94d8, none, assimilate (theory-a96ac, theory-a82a4, none, assert(fib−1, 0)), nil, theory-aa12c)) | E7 |
| clause 3 (exit): prove(theory-a96ac, prologAss, assimilate(theory-a96ac, theory-a82a4, none, assert(fib(−1, 0)), nil, theory-aa12c)) | E4 |
| clause 1 (call): updateSystem(theory-a96ac, fib, theory-a82a4, theory-aa12c, S7) | C9 |
| clause 1 (exit): updateSystem(theory-a96ac, fib, theory-a82a4, theory-aa12c, theory-aa1f4) | E9 |
| clause 1 (exit): myupdate(theory-a96ac, fib, assert(fib(−1, 0)), nil, theory-aa1f4, theory-aa12c) | E1 |

Again on the left hand side is indicated the relevant clause of the "prove" or "update" predicate (the "update" predicate has only one clause) as appropriate and whether the clause is being called or returned. Again the nesting of the calls is shown on the right hand side.

The overall goal to be satisfied is attempting to add the clause fib(-1,0) to the procedure fib/2 in the theory named "fib" in the system theory represented by the descriptor "theory_a92ec".

The succession of "calls" and "exits" achieve this satisfaction by the following process:

1) clause 1 of the "update" predicate is invoked (there is only one clause in this procedure).
2) clause 1 of the "prove" predicate is invoked in an attempt to locate the theory named "fib" in system theory "theory_a92ec".
3) a subgoal (interpretTheory) of that clause of "prove" is invoked which exits with its Theory, IntName, AssName, AttrName variables all instantiated to the required terms.
4) clause 1 of the "prove" predicate exits successfully.
5) now that the assimilator of "fib" is known (prologAss) it is invoked via a call to "prove" to achieve the required update.
6) this causes the third clause of "prove" to be invoked in an attempt to find the theory associated with then name "prologAss" and then to attempt satisfaction of the required update. This clause of "prove" has two subgoals which attempt to perform these two tasks.
7) the first subgoal invokes "prove" to locate "prologAss", which in turn invokes "interpretTheory". "prologAss" is successfully found as well as the name of its interpreter.
8) "prove" is further invoked to attempt a satisfaction of the update (assimilation) by proving using "prologAss"'s interpreter (prologInt) that the assimilation is satisfiable.
9) this causes the system theory to be searched again for the theory corresponding to the name "prologInt".
10) this is a special case of "prove" since "prologInt" is the built-in interpreter. This case is trapped by the second clause of "prove".
11) the assimilation is successfully completed (the exit of clause 3 of "prove").
12) the final stage is to update the system theory "theory_a92ec" the one in which all the dereferencing of names has occurred. "updateSystem" is invoked which causes variable S7 to be bound to the updated system theory "theory_a9d6c".

The result of this satisfaction is that if "fib" is dereferenced in the first system theory "theory_a92ec", then the clause "fib(-1,0)" is not part of the procedure fib/2. If it is dereferenced in "theory_a9d6c" then fib(-1,0) is part of fib/2.

The present system extends the declarative Prolog style, as used in individual theories, to the incorporation of an organisation of theory-to-theory relationships. This is in contrast to the prior systems, in which theory-to-theory relationships are implemented in a manner which is more implicit. Each of these types of relationship can be a many-to-many relationship. For example, a given theory can have more than one interpreter. (if this is the case it is necessary to perform inference within the system each time this theory is invoked to determine which interpreter is appropriate at this time—probably on the basis of the goal that has to be proved.) All these relationships are dynamic. Successive versions of a system theory can have existing relationships updated and new relationships added. The relationships do not need to be specified in the system theory as facts; they can equally well be specified in rules of arbitrary complexity. The only fixed relationship is that the system theory's interpreter is the built-in interpreter.

For each theory, the system theory holds a relationship statement between that theory and other theories associated with it; that is, all relationships between theories are explicitly represented in the form of a set of logical statements by the system theory. It is convenient for the relationship statement to define various distinct forms of association or relationship, so that the types of relationship of a theory to other theories are automatically determined; in other words, there are distinct types of relationship between a theory and an interpreter theory, an assimilator theory and an attribute theory. It will however be realised that differences between the various types of relationship are only defined by the structure of the system itself to the extent that each type of relationship has a specific place (first, second, etc) in the relationship statement. The choice of which place is used to give a relationship with an interpreter theory, which with an assimilator theory and which with an attribute theory is arbitrary and to a large extent a matter of interpretation, though of course the choice, once made, must be the same for all theories.

As we have seen, the ability to query the system as a theory enables selection of particular entities (such as an interpreter) on the basis of information contained in the query. It also readily supports arbitrary levels of interpretation to be introduced in handling a query—an interpreter is found by querying the system (that is, the system theory), and then this interpreter might be interpreted by another interpreter found by querying the system.

The present invention also has advantages concerning the updating of theories. All operations on theories, including updating, are declarative and hence free of side-effects. Every update to a named theory produces a new theory. Since both are part of the system theory, a new system will also result. Hence access to all versions of all theories is potentially possible. The update model used in the present system is completely declarative. This means that any update to (addition to or subtraction from) a theory results in a new theory. Both the new version and the previous version are accessible as long as references to both still exist. This can be achieved with very little overhead cost in time and space by arranging for versions of a theory to share all common data.

Figure 3:
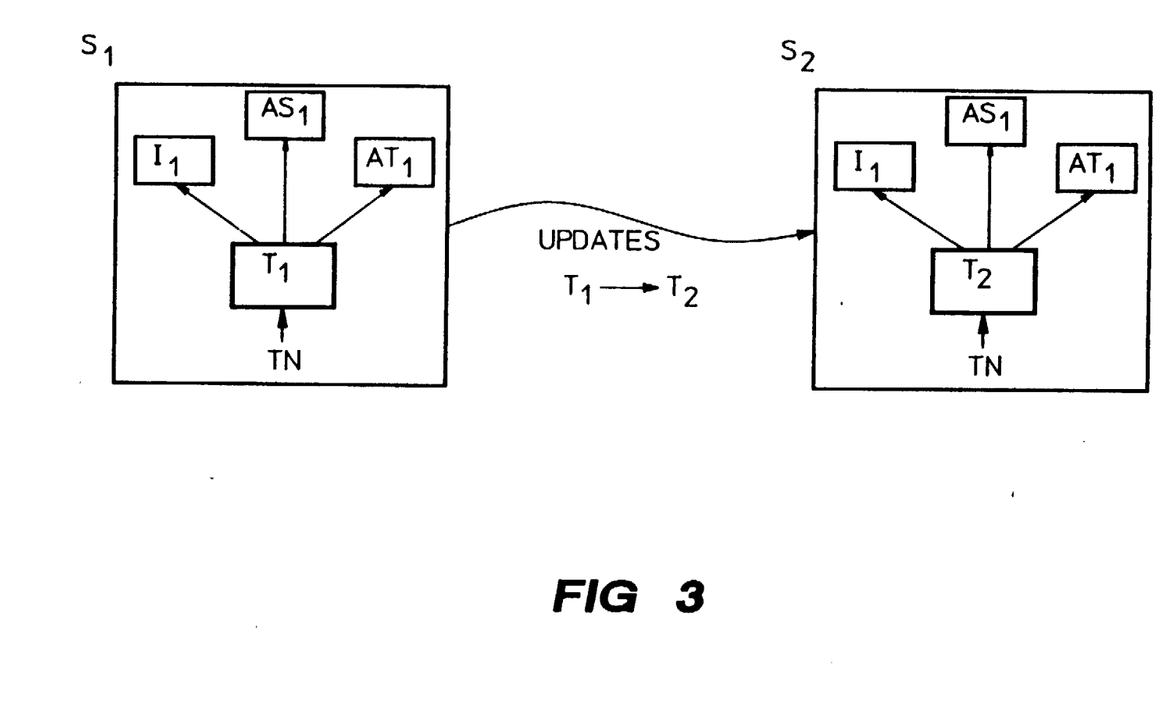
FIG. 3 depicts the updating of a theory having a name TN according to the teachings of the invention.

FIG. 3 depicts the updating of a theory named TN and can be summarised:

Update ($S_1$, TN, Updates, $S_2$, $T_2$)

The corresponding statements in the system theories named S1 and S2 are shown below:

theory (system, System 1, I, AS, AT)
theory (TN, ($T_1$), I, AS, AT)
theory(system, System 2, I, AS, AT)
theory (TN, ($T_2$) I, AS)

The manner in which the relationships between the various theories are held in the present system allows the relationships between the theories and the population of the theories to change with time. For example, it may be desired to investigate the effects of various changes of exchange rate. To this end, a financial theory (not shown) may be constructed which defines the manner in which discounts are determined. A series of queries may be directed to this financial theory and these may cause the setting up of a series of distinct discount theories (not shown), one for each possible exchange rate being considered. The system theory operates to keep track of these different discount theories, which are of course mutually inconsistent. (A simpler example is when a theory is updated; the system then includes the old theory and the new (updated) one). The system then exists in a considerable number of distinct versions, corresponding to the different possible exchange rates being considered or to successive periods of time and the appropriate version has to be selected for any particular query It will be appreciated that the present invention has been described with reference to a particular embodiment in which the system theory has clauses of a five-place predicate defining the organisation of theories in the system. It is possible for different theory organisations to be defined by the system theory in which the system theory has n-place statements defining theory relationships where n is greater than or equal to three i.e. places for the theory name, the theory itself and at least one metatheory.

APPENDIX A

```
fib.pl loading . . .
fib.pl loaded.
lemma.pl loading . . .
lemma. pl loaded.
fibattr loading . . .
fibattr loaded.
fib.pl loading . . .
fib.pl loaded.
myprove loading. . .
myprove loaded.
prologAss.pl loading . . .
prologAss.pl loaded.
The System Theory
theory(system, Theory, prologInt, prologAss, none) <-
         system(theory) & true.
theory(fib, #fib(0, 1) <- true.
         fib(1, 1) <- true.
         fib(N, M3) <-
             N > 1 &
             M is N - 1 &
             M1 is N - 2 &
             fib(M, FM) &
             fib(M1, FM1) &
             M3 is FM + FM1 & true.
         nil
         , prologInt, prologAss, none) <- true.
theory(lemma, #interpret(TheoryName, Theory, AttrName, Goals) <-
             call(Theory, Goals) & true.
         nil
         , prologInt, prologAss, none) <- true.
theory(fibattr, #uniqueSoln(fib(X, _)) <-
             ground(X) &
             ! & true.
         nil
         , prologInt, prologAss, none) <- true.
theory(fibl, #fib(0, 1) <- true.
         fib(1, 1) <- true.
         fib(N, M3) <-
             N > 1 &
             M is N - 1 &
             M1 is N - 2 &
             fib(M, FM) &
             fib(M1, FM1) &
             M3 is FM + FM1 & true.
         nil
         , lemma, prologAss, fibatttr) <- true.
theory(myprove, #myupdate(System, TheoryName, Clauses, NewSystem, NewTheory) <-
             write('clause 1 (call): ') &
             write(update(System, TheoryName, Clauses, NewSystem, NewTheory)) &
             nl &
             myprove(System, system, theory(TheoryName, Theory, IntName, AssName, AttrName)) &
             myprove(System, AssName, assimilate(System, Theory, AttrName, Clauses, NewTheory)) &
```

APPENDIX A-continued

```
        updatesSystem(System, TheoryName, Theory, NewTheory, NewSystem) &
        write('clause 1 (exit): ') &
        write(update(System, TheoryName, Clauses, NewSystem, NewTheory)) &
        nl & true.
    updateSystem(System, TheoryName, Theory, NewTheory, NewSystem) <-
        write('clause 1 (call): ') &
        write(updateSystem(System, TheoryName, Theory, NewTheory, NewSystem)) &
        nl &
        update(system, replace(theory(TheoryName, Theory, IntName, AssName, AttrName) <- true,
        theory(TheoryName, NewTheory, IntName, AssName, AttrName) <- true) . nil, System, NewSystem
        write('clause 1 (exit): ') &
        write(updateSystem(System, TheoryName, Theory, NewTheory, NewSystem)) &
        nl & true.
    interpretTheory(T, G) <-
        write('clause 1 (call): ') &
        write(interpretTheory(T, G)) &
        nl &
        call(T, G) &
        write('clause 1(exit): ') &
        write(interpretTheory(T, G)) &
        nl & true.
    myprove(System, system, Goals) <-
        write('clause 1 (call): ') &
        write(prove(System, system, Goals)) &
        nl &
        interpretTheory(System, Goals) &
        write('clause 1 (exit): ') &
        write(prove(System, system, Goals)) &
        nl & true.
    myprove(System, prologint, interpret(TheoryName, Theory, AttrName, Goals)) <-
        write('clause 2 (call): ') &
        write(prove(System, prologInt, interpret(TheoryName, Theory, AttrName, Goals))) &
        nl &
        interpretTheory(Theory, Goals) &
        write('clause 2 (exit): ') &
        write(prove(System, prologInt, interpret(TheoryName, Theory, AttrName, Goals))) &
        nl & true.
    myprove(System, TheoryName, Golas) <-
        write('clause 3 (call): ') &
        write(prove(System, TheoryName, Goals)) &
        nl &
        myprove(System, system, theory(TheoryName, Theory, IntName, AssName, AttrName)) &
        myprove(System, IntName, interpret(TheoryName, Theory, AttrName, Goals)) &
        write('clause 3 (exit): ') &
        write(prove(System, TheoryName, Goals)) &
        nl & true.
    nil
    , prologInt, prologAss, none) <- true.
theory(prologAss, #assimilate(., T, .. nil. T) <- true.
    assimilate(S, T, .., assert(C) . Rest, NT) <-
        normalize(C, NC) &
        assertz(T, T1, NC) &
        assimilate(S, T1, .., Rest, NT) & true.
    assimilate(S, T, .., retract(C) . Rest, NT) <-
        normalize(C, NC) &
        retract(T, T1, NC) &
        assimilate(S, T1, .., Rest, NT) & true.
    nil
    prologInt. prologAss, none) <- true
SUCCESS
INTERPRET TIME: 640 ms
INFERENCE STEPS: 243
```

What is claimed is:

1. A method of controlling the operation of a computer database system in processing a query, the system being of the kind that has an inference engine, query processing means, and a plurality of metatheories, the method comprising:
   providing a knowledge base;
   logically partitioning the knowledge base into a plurality of object theories;
   providing a system theory that defines many-to-many coupling relationships between the object theories and a plurality of the metatheories including an interpreter metatheory;
   selecting an object theory and associated metatheories according to the system theory in dependence on parameters of a query to be processed; and
   processing the query by the theories so chosen.

2. A method according to claim 1 wherein the step of providing a system theory comprises providing a system theory that defines a coupling relationship between the object theories and an assimilator metatheory.

3. A method according to claim 1 wherein the step of providing a system theory comprises providing a system theory that defines a coupling relationship between the object theories and an attribute metatheory.

4. A method according to claim 1 wherein a coupling relationship is expressed as a clause of first-order logic and wherein the system theory includes a declarative model that provides an explicit description of querying and updating within the system.

* * * * *